United States Patent
Zhang et al.

(10) Patent No.: US 7,115,669 B2
(45) Date of Patent: Oct. 3, 2006

(54) MINIMIZING THE VOLUME OR MAXIMIZING THE PRODUCTION RATE OF SLURRY BUBBLE REACTORS BY USING LARGE GAS FLOW RATES AND MODERATE SINGLE PASS CONVERSION

(75) Inventors: Jianping Zhang, Ponca City, OK (US); Harold A. Wright, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 631 days.

(21) Appl. No.: 10/205,215

(22) Filed: Jul. 25, 2002

(65) Prior Publication Data

US 2003/0027875 A1     Feb. 6, 2003

Related U.S. Application Data

(60) Provisional application No. 60/307,742, filed on Jul. 25, 2001.

(51) Int. Cl.
    C07C 27/00     (2006.01)
(52) U.S. Cl. .................. 518/706; 518/700; 518/705
(58) Field of Classification Search ............... 518/706, 518/700, 705
    See application file for complete search history.

(56) References Cited

U.S. PATENT DOCUMENTS

| | | | |
|---|---|---|---|
| 5,015,366 A | 5/1991 | Ruetber et al. | ............. 208/408 |
| 5,348,982 A | 9/1994 | Herbolzheimer et al. | ... 518/700 |
| 5,407,644 A | 4/1995 | Rytter et al. | ................. 422/147 |
| 5,422,375 A | 6/1995 | Rytter et al. | ................. 518/700 |
| 5,520,890 A | 5/1996 | Lorentzen et al. | .......... 422/197 |
| 5,527,473 A | 6/1996 | Ackerman | ................... 210/767 |
| 5,639,798 A | 6/1997 | Wilson et al. | ................. 518/714 |
| 5,827,902 A * | 10/1998 | Maretto et al. | ............. 518/706 |
| 5,939,350 A | 8/1999 | Singleton et al. | ........... 502/230 |
| 5,961,933 A | 10/1999 | Casanave et al. | ........... 422/211 |
| 6,060,524 A | 5/2000 | Casanave et al. | ........... 518/706 |
| 6,156,809 A * | 12/2000 | Clark et al. | ................. 518/719 |
| 6,169,120 B1 | 1/2001 | Beer | ......................... 518/715 |

OTHER PUBLICATIONS

Article entitled "*A theoretical model for the performance of bubble-column reactors used for Fischer-Tropsch synthesis,*" by David Stern et al., Chemical Engineering Science, vol. 40, No. 9, pp. 1665-1677, 1985.

Article entitled "*Analysis of the design of bubble-column reactors for Fischer-Tropsch synthesis,*" by David Stern et al., Ind. Eng. Chem. Process Des. Dev., 24, pp. 1213-1219, 1985.

Article entitled "*Modeling of bubble column slurry reactors for multiple reactions,*" by D.B. Bukur et al., AIChE Journal, vol. 33, No. 7, pp. 1197-1206, 1987.

(Continued)

*Primary Examiner*—J. Parsa
(74) *Attorney, Agent, or Firm*—Conley Rose P.C.

(57) ABSTRACT

A gas-agitated multiphase reactor system that is effective for enabling maximum reactor productivity or minimizing reactor volume comprising at least two stages with or without recycle, wherein inlet gas superficial velocity is at least 20 cm/sec at Fischer-Tropsch synthesis, yielding a total syngas conversion of greater than about 90%, while syngas conversion in each reactor is less than 60%. More specifically, the total reactor volume is held to a minimum such that minimum reactor volume is less than 0.02 cubic meters total reactor volume/(kg $C_{5+}$/hr production).

6 Claims, 4 Drawing Sheets

OTHER PUBLICATIONS

Article entitled "*Comparison of axial dispersion and mixing cell models for design and simulation of Fischer-Tropsch slurry bubble column reactors*," by J.R. Turner et al., Chemical Engineering Science, vol. 45, No. 8, pp. 2317-2324, 1990.

Article entitled "*Liquid backmixing in bubble columns*," by Y.B. Yang et al., Chemical Engineering Science, vol. 47, No. 9-11, pp. 2859-2864, 1992.

Article entitled "*Mass transfer in a three-phase reactor operating at elevated pressures and temperatures*," by Min-Yan Change et al., Chemical Engineering Science, vol. 47, No. 7, pp. 1779-1790, 1992.

Article entitled "*Effect of scale on liquid recirculation in bubble columns*," by Sailesh B. Kumar et al., Chemical Engineering Science, vol. 49, No. 24B, pp. 5637-5652, 1994.

Article entitled "*Bubble column reactors in Fischer-Tropsch synthesis*," by S.C. Saxena, Catal. Rev.—Sci. Eng., 37(2), pp. 227-309, 1995.

Article entitled "*Gas holdup in slurry bubbly columns: effect of column diameter and slurry concentrations*," by Rajamani Krishna et al., AIChE Journal, vol. 43, No. 2, pp. 311-316, 1997.

Article entitled "*Process development and scale up: IV. Case history of the development of Fischer-Tropsch synthesis process*," by S.T. Sie, Reviews in Chemical Engineering, vol. 14, No. 2, pp. 109-157, 1998.

Article entitled "*Numerical simulation of gas-liquid dynamic in cylindrical bubble column rectors*," by Jayanta Sanyal et al., Chemical Engineering Science, vol. 54, pp. 5071-5083, 1999.

Article entitled "*Dynamic simulation of bubby flow in bubble columns*," by Y. Pan et al, Chemical Engineering Science, vol. 54, pp. 2481-2489, 1999.

Article entitled "*Modelling of a bubble column slurry reactor for Fischer-Tropsch synthesis*," by C. Maretto et al., Catalysis Today, vol. 52, pp. 279-289, 1999.

Article entitled "*Gas holdup and mass transfer in bubble column reactors operated at elevated pressure*," by H.M. Letzel et al., Chemical Engineering Science, vol. 54, pp. 2237-2246, 1999.

Article entitled "*Multicomponent reaction engineering model for Fe-catalyzed Fischer-Tropsch synthesis in commercial scale slurry bubble column reactors*," by Gerard P. van der Laan et al., Chemical Engineering Science, vol. 54, pp. 5013-5019, 1999.

Article entitled "*Fundamentals and selection of advanced Fischer-Tropsch reactors*," by S.T. Sie et al., Applied Catalysis A: General 186, pp. 55-70, 1999.

Article entitled "*Hydrodynamic simulation of methanol synthesis in gas-liquid slurry bubble column reactors*," by Yuanxiang Wu et al., Chemical Engineering Science, vol. 55, pp. 573-587, 2000.

Article entitled "*Hydrodynamic Characterization of Slurry Bubble-Column Reactors for Fischer-Tropsch Synthesis*," by N.B. Jackson et al., Proc.—Annu. Int. Pittsburgh Coal Conf. (1996), 13$^{th}$ (vol. 2), 1226-1231.

N.B. Jackson et al., *Hydrodynamic Characterization of Slurry Bubble-Column Reactors for Fischer-Tropsch Synthesis*, Proc.-Annu. Int. Pittsburgh Coal Conf. (1996), 13$^{th}$ vol. 2, 1226-1231.

PCT International Search Report for PCT Application No. PCT/US02/23796 dated Mar. 14, 2003.

* cited by examiner

MINIMIZING THE VOLUME OR MAXIMIZING THE PRODUCTION RATE OF SLURRY BUBBLE REACTORS BY USING LARGE GAS FLOW RATES AND MODERATE SINGLE PASS CONVERSION

RELATED APPLICATIONS

None.

STATEMENT REGARDING FEDERALLY SPONSORED RESEARCH OR DEVELOPMENT

Not applicable.

TECHNICAL FIELD OF THE INVENTION

The present invention relates to a process for the preparation of hydrocarbons from synthesis gas, i.e., a mixture of carbon monoxide and hydrogen, typically labeled the Fischer-Tropsch process. More particularly, this invention relates to slurry bubble reactors that can maximize the production rate and/or reduce the reactor volume in a Fischer-Tropsch process. Still more particularly, the present invention relates to a design criterion that achieves a high conversion rate in a reduced reactor volume.

BACKGROUND

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive. To improve the economics of natural gas use, much research has focused on the use of methane as a starting material for the production of higher hydrocarbons and hydrocarbon liquids, which are more easily transported and thus more economical. The conversion of methane to hydrocarbons is typically carried out in two steps. In the first step, methane is converted into a mixture of carbon monoxide and hydrogen (i.e., synthesis gas or syngas). In a second step, the syngas is converted into hydrocarbons.

This second step, the preparation of hydrocarbons from synthesis gas, is well known in the art and is usually referred to as Fischer-Tropsch synthesis, the Fischer-Tropsch process, or Fischer-Tropsch reaction(s). Fischer-Tropsch synthesis generally entails contacting a stream of synthesis gas with a catalyst under temperature and pressure conditions that allow the synthesis gas to react and form hydrocarbons.

More specifically, the Fischer-Tropsch reaction is the catalytic hydrogenation of carbon monoxide to produce any of a variety of ranging from methane to higher alkanes, olefins and oxygenated hydrocarbons, including aliphatic alcohols. Research continues on the development of more efficient Fischer-Tropsch catalyst systems and reaction systems that increase the selectivity for high-value hydrocarbons in the Fischer-Tropsch product stream.

There are continuing efforts to design reactors that are more effective at producing these desired products. Product distribution, product selectivity, and reactor productivity depend heavily on the type and structure of the catalyst and on the reactor type and operating conditions. It is particularly desirable to maximize the production of high-value liquid hydrocarbons, such as hydrocarbons with five or more carbon atoms per hydrocarbon chain ($C_{5+}$). Components ($C_{5+}$) that boil at temperatures above 40° C., are herein defined as "heavy components." "Light components" are defined as materials that do not condense at 0° C. or higher.

Originally, the Fischer-Tropsch synthesis was operated in packed bed reactors. These reactors have several drawbacks, such as temperature control, that can be overcome by gas-agitated slurry reactors or slurry bubble column reactors. Gas-agitated multiphase reactors sometimes called "slurry reactors" or "slurry bubble columns," operate by suspending catalytic particles in liquid and feeding gas reactants into the bottom of the reactor through a gas distributor, which produces gas bubbles. As the gas bubbles rise through the reactor, the reactants are absorbed into the liquid and diffuse to the catalyst where, depending on the catalyst system, they are converted to gaseous and liquid products. The gaseous products formed enter the gas bubbles and are collected at the top of the reactor. The liquid products are recovered from the suspending liquid by a variety of techniques such as settling, filtration, magnetic separation techniques, hydrocyclones, etc.

Gas-agitated multiphase reactors inherently have very high heat transfer rates and, therefore, reduced reactor cost. This and the ability to remove and add catalyst online are some of the main advantages of such reactors as applied to the Fischer-Tropsch synthesis, which is exothermic.

Sie and Krishna (Appl. Catalysis A: General, (1999) 186 55–70) give a history of the development of various Fischer Tropsch reactors and the advantages of slurry bubble columns over fixed bed reactors.

Much previous work has been aimed at optimization of the slurry bubble column system for Fischer Tropsch and other chemistries. Wu and Gidaspow, (Chem. Eng. Sci, 2000, 55, 573–587) show examples of numerical simulations of hydrodynamics of Slurry Bubble Column processes. Letzel, Schouten, Krishna and van den Bleek (Chem. Eng. Sci, 1999, 54, 2237–2246) developed a simple model for gas holdup and mass transfer at high pressure in a slurry bubble column. Maretto and Krishna (Catalysis Today (1999), 52, 279–289), developed a two bubble class model that could be used to identify parameters for the increase in the reactor productivity. Sanyel, Vasquez, Roy, and Dudukovic (Chem. Eng. Sci. (1999), 54, 5071) and Pan, Dudukovic, and Chang (Chem. Eng. Sci., (1999), 54, 2481) showed examples of computational fluid dynamic modeling and optimization of a slurry bubble column reactor irrespective of the chemistry. Krishna, DeSwart, Ellenberger, Martina, and Maretto (AIChE J. 1997, 43(2) 311) measured experimentally the increase in gas holdup with an increase in the gas velocity and solid concentration in a slurry bubble column in churn turbulent regime.

Considerable patent literature addresses the optimization of the Fischer Tropsch Slurry Bubble Column reactor (SBCR) and the overall system. U.S. Pat. No. 5,348,982 describes a mode of operation for SBCR. U.S. Pat. No. 6,060,524 and U.S. Pat. No. 5,961,933 show that improved operation can be obtained by introduction of liquid recirculation.

Van der Laan, Beenackers, and Krishna (Chem. Eng. Sci. (1999), 54, 5013) showed that for a Fischer Tropsch SBCR using an iron catalyst that the reactor conversion will decrease and productivity will increase with increases in the inlet superficial gas velocity. Jackson, Torczynski, Shollenberger, O'Hem, and Adkins (Proc. Annual Int. Pittsburgh Coal Conf. (1996), 13th (Vol 2) 1226) showed experimental evidence of the increase of gas hold up with increase in the inlet superficial velocity in a SBCR for Fischer Tropsch synthesis. Saxena (Cat. Rev. -Sci. Eng. (1995) 37, 227) also presents detailed experimental findings and correlations for the optimization of a Fischer Tropsch SBCR. It is clear from all the work in industry and academia that there is a need for an optimized Fischer Tropsch reactor and reactor configuration.

Current commercial slurry reactors for the Fischer-Tropsch process are envisioned in Choi, Kramer, Tam, and Fox (1996, paper presented at the 1997 Spring AIChE meeting) as first and second stage slurry bubble columns where the number of reactors in the first stage is twice the number in the second stage. An example of this configuration includes using four slurry bubble reactors in parallel as a first stage and another two parallel reactors in a second stage. Between the two stages a condenser is typically used to condense the heavy components, and in some operations water, from the gas stream. High conversion rates are achieved from this process. However, the costs associated with this design are high, due to the number and size of reactors required. It is desirable to design a gas-agitated multiphase reactor system that enables maximum reactor productivity or minimized reactor volume.

The performance of a SBCR is a combined result of reaction kinetics, heat and mass transfer, and multiphase hydrodynamics. At a given reactor geometry and operating conditions, the productivity of an SBCR is related to the catalyst activity. For a given catalyst, and therefore a given activity, the reactor productivity changes with the gas flow rate at the reactor inlet. As illustrated in FIG. 1, a high gas flow rate corresponds to a high gas holdup in the reactor. Increased gas holdup would reduce the slurry volume in the reactor. The conversion also decreases with linear velocity in other reactors like fixed bed ones, as a result of contact time, as well as reduced liquid volume as a result of increased gas holdup. Therefore the conversion in the reactor decreases with an increase in superficial inlet gas velocity even faster than what would be expected if the liquid volume remained constant, as shown in FIG. 2. On the other hand, the high gas flow rate gives a large gas-liquid contact area, contributing to a high productivity, as shown in FIG. 3. An optimum solution can be found based on the facts that the conversion decreases and the productivity increases with the increase of inlet gas flow rate. Previous work has not examined closely the interaction between reactor variables and the way in which the overall reactor system is configured.

SUMMARY OF THE INVENTION

The present invention provides a gas-agitated multiphase reactor system that is effective for enabling maximum reactor productivity and/or minimizing reactor volume. An exemplary minimized reactor volume is less than 0.02 m$^3$ total reactor volume/(kg $C_{5+}$/hr production). Total reactor volume is defined by the following equation: $V=d^2/4\pi$, wherein V is the total reactor volume (including the cooling coils), d is the reactor shell diameter (the inner diameter of the reactor not subtracting the size of the cooling coils), and h is the expanded slurry height. The expanded slurry height is the total slurry height when gas is fed into the reactor, typically about 70–90% of the total vessel height. In accordance with a preferred embodiment, the present reactor system comprises at least two stages with or without recycle, wherein inlet gas superficial velocity is at least 20 cm/sec, wherein syngas conversion in each stage or reactor is less than 60%, and wherein overall syngas conversion is at least 84% when there are two stages and at least about 90% when there are three or more stages. Superficial velocity is defined herein as the superficial gas velocity using the inlet reactor conditions. The cross sectional area is determined from the overall cross section using the outer reactor diameter, and not taking into account the cross sectional area that is used for heat transfer. Reactor production rate is defined herein as the amount of hydrocarbons produced by a reactor per hour of an operation, typically given in grams per hour, pounds per hour, or barrels per day. Alternatively, productivity of a reactor can be expressed in terms of either grams of $C_{5+}$ hydrocarbon/hr/gram of catalyst or kilograms $C_{5+}$ hydrocarbon/hr/m$^3$ expanded catalyst bed. For example, in some embodiments, the $C_{5+}$ productivity for each reactor is at least 0.2 grams of $C_{5+}$ hydrocarbon/hr/gram of catalyst. In other embodiments, the overall $C_{5+}$ volumetric production rate is greater than about 50 kilograms $C_{5+}$ hydrocarbon/hr/m$^3$ total reactor volume.

An alternate embodiment of the present invention includes a method for minimizing the volume of slurry bubble reactor systems by providing at least two stages with or without recycle, wherein inlet gas superficial velocity is at least 20 cm/sec, syngas conversion in each stage or reactor is less than 60% and overall syngas conversion is at least 84% when there are two stages and at least about 90% when there are three or more stages.

Another alternate embodiment of the present invention includes a method for maximizing the production rate of slurry bubble reactor systems by providing at least two stages with or without recycle, wherein inlet gas superficial velocity is at least 20 cm/sec, syngas conversion in each stage or reactor is less than 60% and overall syngas conversion is at least 84% when there are two stages and at least about 90% when there are three or more stages.

BRIEF DESCRIPTION OF THE DRAWINGS

For a detailed description of the preferred embodiments of the present invention, reference will now be made to the accompanying Figures, wherein.

DETAILED DESCRIPTION OF A PREFERRED EMBODIMENT

It has been discovered that, in a gas-agitated slurry reactor or slurry bubble column reactor, a maximum reactor productivity or a minimum reactor volume can be achieved by selecting a large gas flow rate and a relatively low conversion per gas pass. The unreacted gas can be either fed to another reactor or be recycled back to the mix with the inlet gas stream. A high gas flow rate gives a high mass-transfer rate and a large gas-liquid contact area. All these effects can increase the reactor productivity.

Figure 4:
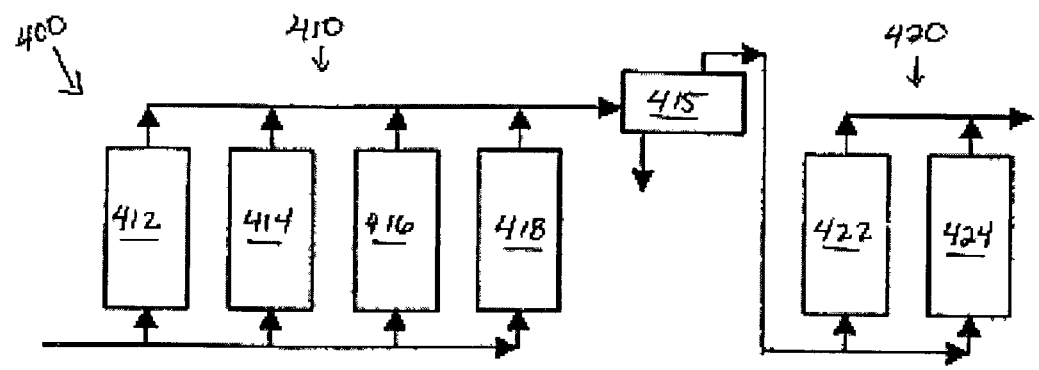
FIG. 4 is a schematic illustration of a conventional slurry reactor setup (prior art)

Referring initially to FIG. 4, and beginning at the lower left end of the drawing, a conventional system 400 preferably includes a first stage of slurry reactors in parallel 410, a condensing stage 415 between first stage 410 and second stage 420, and a second stage of slurry reactors in parallel 420. First stage 410 preferably comprises four slurry reactors 412, 414, 416, and 418. Second stage 420 comprises two slurry reactors 422 and 424. A system like this is typically run at about 70% syngas per pass conversion in each reactor and provides about 90% overall syngas conversion.

Figure 5:
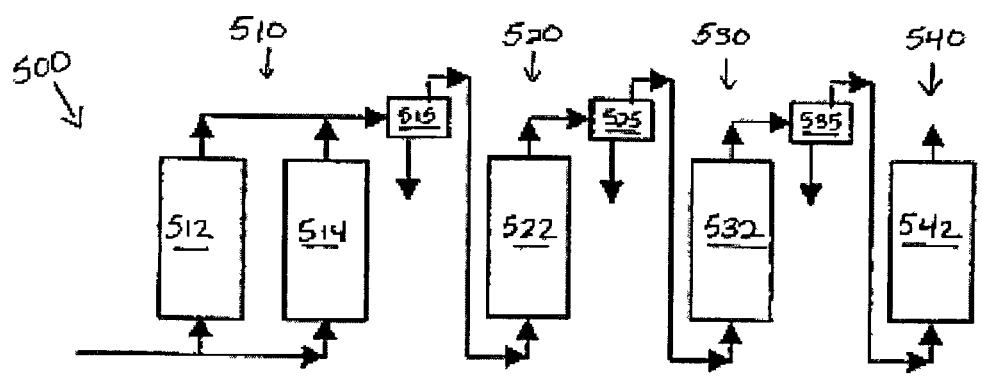
FIG. 5 is a schematic illustration of a preferred embodiment of the present invention.

Referring now to FIG. 5, one preferred embodiment of the invention includes a system 500 comprising a first stage of slurry reactors in parallel 510, a second stage of slurry reactors 520, a third stage of slurry reactors 530, and a fourth stage of slurry reactors 540, a condensing stage 515 between first stage 510 and second stage 520, a condensing stage 525 between second stage 520 and third stage 530, and a condensing stage 535 between the third stage 530 and fourth stage 540. In the embodiment shown, first stage 510 preferably comprises two slurry reactors 512 and 514; second stage 520 preferably comprises one slurry reactor 522; and third stage 530 and fourth stage 540 each comprise preferably one slurry reactor 532 and 542 respectively. It will be understood that each stage could comprise more reactors than the number shown, to provide, for example, a larger production capacity. The embodiments illustrated herein have been selected for ease of comparison and discussion only and are not intended to be limiting.

Figure 6:
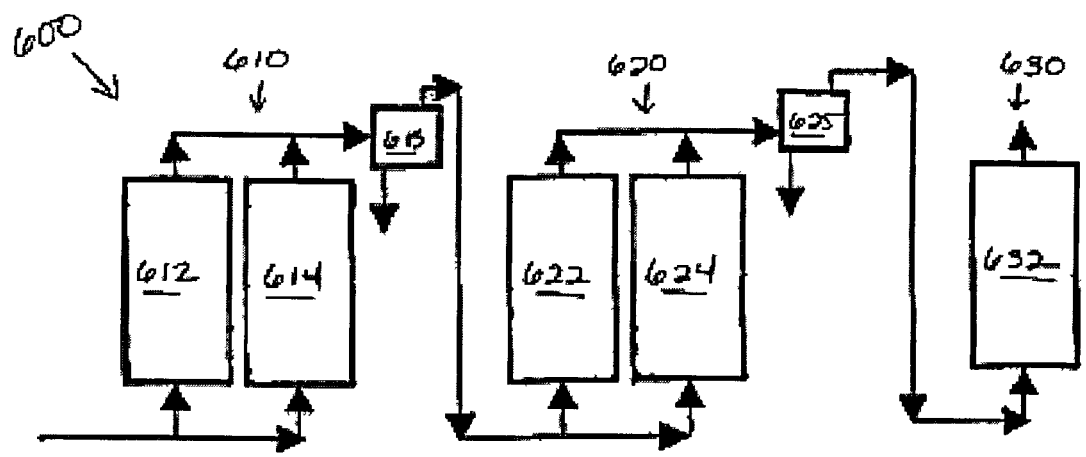
FIG. 6 is a schematic illustration of another preferred embodiment of the present invention.

FIG. 6 represents another preferred embodiment of the current invention. It includes a system 600 comprising a first stage of slurry reactors in parallel 610, a second stage of slurry reactors in parallel 620, and a third stage of slurry reactors 630, a condensing stage 615 between first stage 610 and second stage 620, and a condensing stage 625 between second stage 620 and third stage 630. First stage 610 preferably comprises two slurry reactors 612 and 614. Second stage 620 preferably comprises two slurry reactors 622 and 624. Third stage 630 preferably comprises one slurry reactor 632. Again, it will be understood that each stage could comprise more reactors than the number shown.

Operation

In a preferred mode of operation, the reactor in present Fischer-Tropsch systems contain catalysts material and are charged with feed gases comprising hydrogen or a hydrogen source and carbon monoxide. H2/CO mixtures suitable as a feedstock for conversion to hydrocarbons according to the process of this invention can be obtained from light hydrocarbons such as methane by any suitable means such as steam reforming or partial oxidation. The hydrogen is preferably provided by free hydrogen, although some Fischer-Tropsch catalysts have sufficient water gas shift activity to convert some water to hydrogen for use in the Fischer-Tropsch process. It is preferred that the mole ratio of hydrogen to carbon monoxide in the feed be greater than 0.5:1 (e.g., from about 0.67:1 to 2.5:1). The feed gas may also contain carbon dioxide or other compounds that are inert under Fischer-Tropsch reaction conditions, including but not limited to nitrogen, argon, or light hydrocarbons. The feed gas stream should contain a low concentration of compounds or elements that have a deleterious effect on the catalyst. The feed gas may need to be treated to ensure low concentrations of sulfur or nitrogen compounds such as hydrogen sulfide, ammonia and carbonyl sulfides.

The feed gas is contacted with the catalyst in a reaction zone in each reactor. Mechanical arrangements of conventional design may be employed as the reaction zone. The size of the catalyst particles may vary depending on the reactor in which they are to be used. Also, water partial pressure should be kept to a minimum. The water partial pressure is calculated as the mole fraction of water in the reactor outlet gas multiplied by the total outlet pressure of the reactor in a particular stage.

The process is typically run in a continuous mode. In this mode, typically, the gas hourly space velocity through the reaction zone may range from about 100 volume of gas/hr/volume of expanded catalyst bed (v/hr/v) to about 10,000 v/hr/v, preferably from about 300 v/hr/v to about 2,000 v/hr/v. The reaction zone temperature is typically in the range from about 160° C. to about 300° C. Preferably, the reaction zone is operated at conversion promoting conditions at temperatures from about 190° C. to about 260° C. The reaction zone pressure is typically in the range of about 80 psig (653 kPa) to about 1000 psig (6994 kPa), preferably, from 80 psig (653 kPa) to about 600 psig (4237 kPa), more preferably, from about 140 psig (1066 kPa) to about 500 psig (3572 kPa).

The reaction products will have a large range of molecular weights. Typical Fischer-Tropsch catalysts are useful for making hydrocarbons having five or more carbon atoms, especially when the above-referenced space velocity, temperature and pressure ranges are employed.

The wide range of hydrocarbon species produced in the reaction zone will typically result in gas and liquid phase products at the reaction zone operating conditions. Therefore, the effluent stream of the reaction zone will often be a mixed phase stream. The effluent stream of the reaction zone may be cooled to effect the condensation of additional amounts of hydrocarbons and passed into a vapor-liquid separation zone. The vapor phase material may be passed into a second stage of cooling for recovery of additional hydrocarbons. The liquid phase material from the initial vapor-liquid separation zone together with any liquid from a subsequent separation zone may be fed into a fractionation column. Typically, a stripping column is employed first to remove light hydrocarbons such as propane and butane. The remaining hydrocarbons may be passed into a fractionation column wherein they are separated by boiling point range into products such as naphtha, kerosene and fuel oils. Hydrocarbons recovered from the reaction zone and having a boiling point above that of the desired products may be passed into conventional processing equipment such as a hydrocracking zone in order to reduce their molecular weight. The gas phase recovered from the reactor zone effluent stream after hydrocarbon recovery may be partially recycled if it contains a sufficient quantity of hydrogen and/or carbon monoxide, or may be recycled to one or more syngas reactors.

EXAMPLE

The following example illustrates how the present invention achieves conversion rates comparable to current commercial slurry reactors for the Fischer-Tropsch process at a lower cost be maximizing reactor productivity or a minimizing reactor volume.

Referring back to FIG. 4, a conventional Fischer-Tropsch process system 400 is designed to use four slurry bubble reactors in parallel in first stage 410 and another two parallel reactors in second stage 420. Between the two stages condensing stage 415 is used to condense the heave components, and in some instances water, that are present in the gas stream. The superficial gas velocity at the reactor inlet and the syngas conversion are 23.0 cm/s and 73.8% in first stage 410 and 27.2 cm/s and 61.7% in second stage 420, respectively. An overall conversion of about 90% is achieved in this system.

Figure 1:
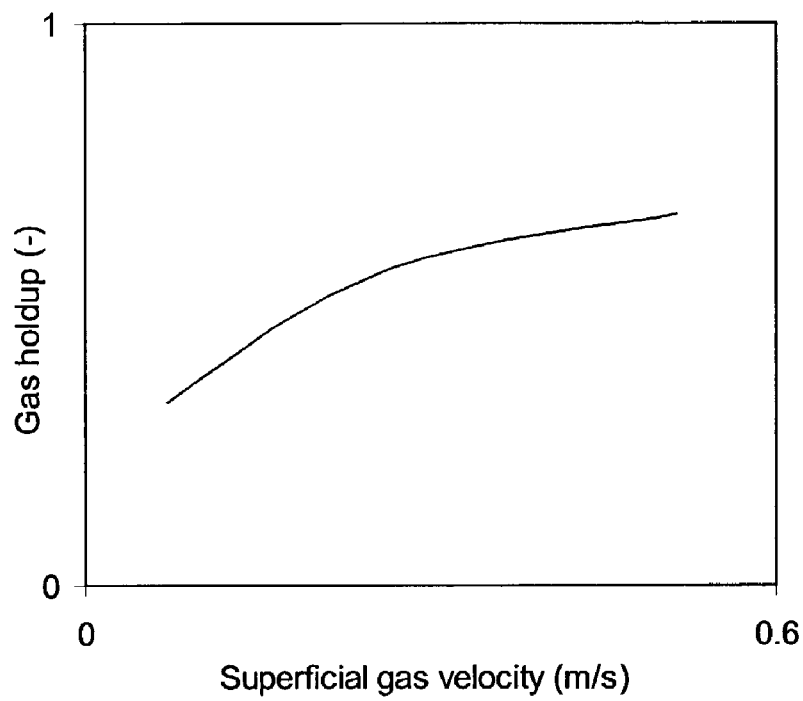
FIG. 1 is a plot illustrating increasing gas holdup with increasing of superficial gas velocity.
Figure 2:
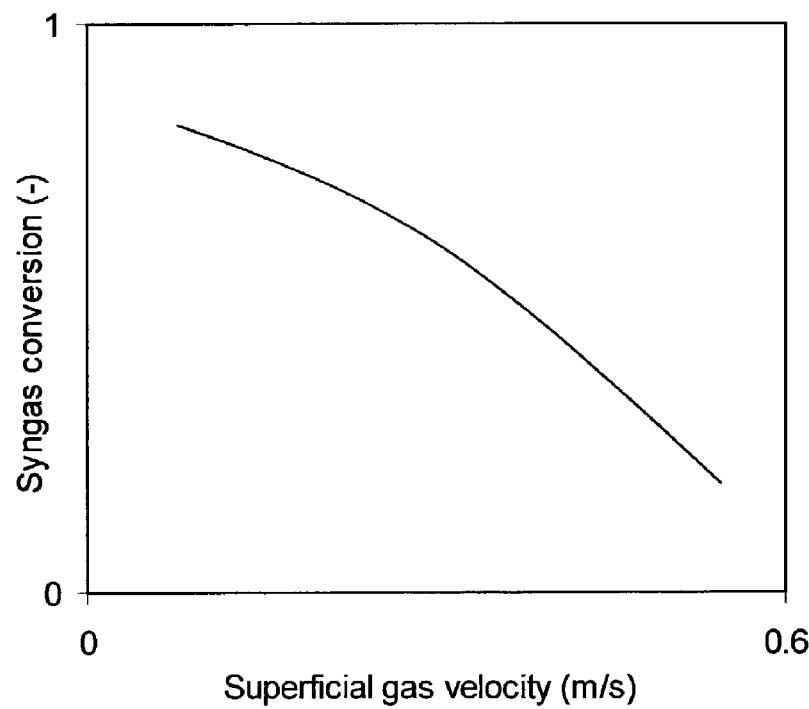
FIG. 2 is a plot illustrating decreasing syngas conversion with increasing of superficial gas velocity.
Figure 3:
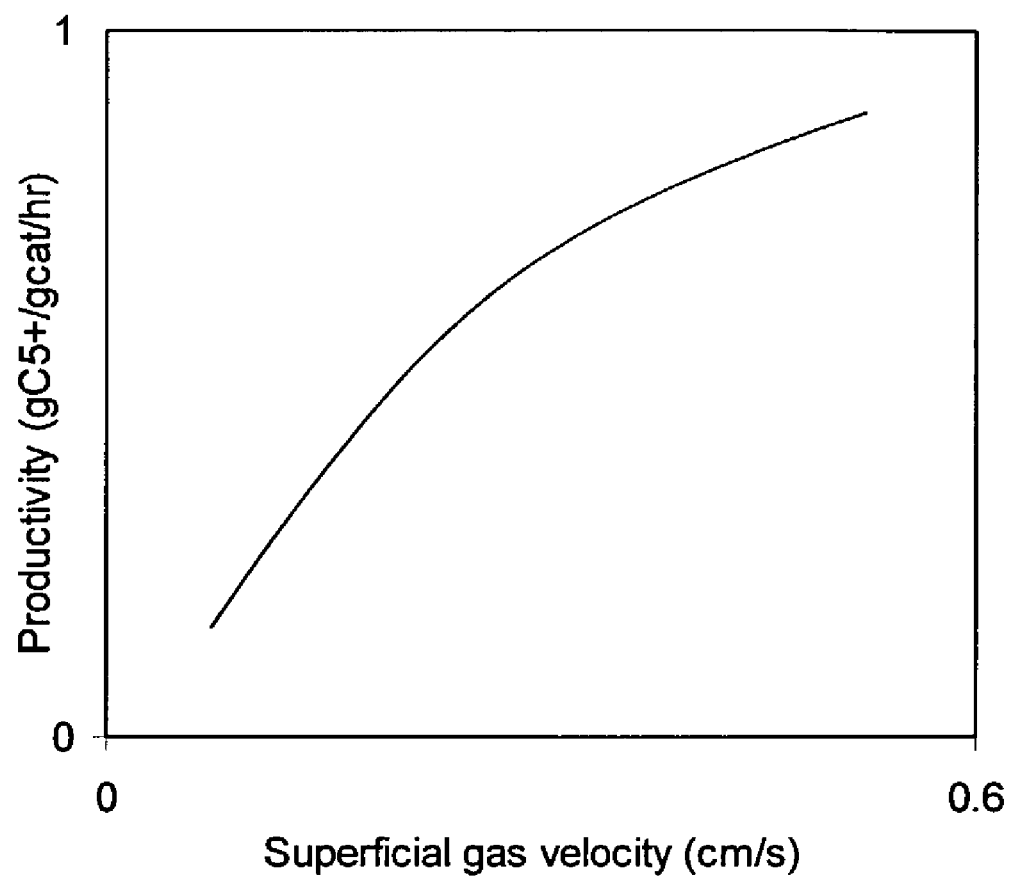
FIG. 3 is a plot illustrating increasing productivity with increasing of superficial gas velocity.

Referring now to FIG. 5, a preferred embodiment of the present invention is designed to use two slurry bubble reactors in parallel in first stage 510 and another three slurry bubble reactors on second, third and fourth stages 520, 530, and 540, respectively. Condensing stage 515, between first and second stages, condensing stage 525, between second and third stages, and condensing stage 535, between third and fourth stages condense heavy components in the gas stream, In some instances, the condensing stages also condense water from their respective streams. The unreacted gas from the two reactors in first stage 510 is fed into second stage 520, from where it is fed into third stage 530, and finally fourth stage 540. A preferred system achieves a similar overall syngas conversion. This process is completed in five reactors instead of the six reactors required in the system of FIG. 1. Expected values for the inlet superficial gas velocity and syngas conversion in the four stages of system 500 are listed in Table 1.

TABLE 1

| Stage | Reactor | Superficial Gas Velocity (cm/s) | Syngas conversion (%) |
|---|---|---|---|
| 1 | 512 and 514 | 46.1 | 52.8 |
| 2 | 522 | 65.5 | 39.8 |
| 3 | 532 | 56.0 | 41.8 |
| 4 | 542 | 50.0 | 41.6 |

Total Conversion

Similarly, increasing the productivity or reducing the reactor volume can be achieved by selecting a large gas flow rate and moderate single pass conversion with the unreacted gas recycled back to mix with the inlet gas stream.

Without further elaboration, it is believed that one skilled in the art can, using the description herein, utilize the present invention to its fullest extent. The embodiments described herein are to be construed as illustrative, and not as constraining the remainder of the disclosure in any way whatsoever.

What is claimed is:

1. A method for maximizing the production rate of a gas-agitated multiphase reactor system comprising:

providing a gas-agitated multiphase reactor system comprising at least two reactor stages, each stage comprising at least one reactor receiving an syngas-containing inlet stream at an inlet gas superficial velocity and generating a product stream, wherein the inlet gas superficial velocity in each reactor is at least 20 cm/sec; and operating each reactor stage to convert syngas to hydrocarbons such that overall syngas conversion for the reactor system is at least about 84%, while syngas per pass conversion in each reactor is less than 60%; and wherein the gas-agitated multiphase reactor system has an overall $C_{5+}$ volumetric production rate greater than about 50 kilograms $C_{5+}$ hydrocarbon/hr/m$^3$ expanded catalyst bed.

2. A method for operating a gas-agitated multiphase reactor system for hydrocarbon production from syngas, comprising:

providing a gas-agitated multiphase reactor system comprising at least two reactor stages and a condensing stage between said first and second reactor stages, wherein each reactor stage comprises at least one reactor receiving a syngas-containing feed stream and generating a product stream;

passing at least a portion of the product stream from the at least one reactor of the first stage through the condensing stage to produce a condensed stream and a gaseous remainder stream comprising uncondensed light components of said portion of the product stream, wherein the syngas-containing feed stream of the at least one reactor of the second reactor stage comprises at least a portion of the gaseous remainder stream; and operating each reactor stage to convert syngas to hydrocarbons such that each reactor has a syngas per pass conversion of less than 60%, while the reactor system has an overall syngas conversion of at least about 84% and an overall $C_{5+}$ hydrocarbons volumetric production rate greater than about 50 kilograms $C_{5+}$ hydrocarbon/hr/m$^3$ total reactor volume.

3. The method of claim 2 wherein each reactor has a water partial pressure of less than 150 psig.

4. The method of claim 2 wherein a portion of said gaseous remainder stream is recycled back to mix with the syngas-containing feed stream of at least one reactor in the first reactor stage.

5. The method of claim 2, wherein no portion of said gaseous remainder stream is recycled back to the first reactor stage.

6. The method of claim 4, wherein the syngas-containing feed stream of each reactor has an inlet gas superficial velocity of at least 20 cm/sec.

* * * * *